(12) United States Patent
Vogel (10) Patent No.: US 11,498,141 B2
(45) Date of Patent: Nov. 15, 2022

(54) GRINDING MACHINE WITH CONTROL SYSTEM AND METHOD FOR TOPOLOGICAL GRINDING OF GEAR WORKPIECES

(71) Applicant: Klingelnberg GmbH, Hückeswagen (DE)

(72) Inventor: Olaf Vogel, Ettlingen (DE)

(73) Assignee: KLINGELNBERG GMBH, Huckeswagen (DE)

( * ) Notice: Subject to any disclaimer, the term of this patent is extended or adjusted under 35 U.S.C. 154(b) by 428 days.

(21) Appl. No.: 16/443,959

(22) Filed: Jun. 18, 2019

(65) Prior Publication Data
US 2019/0388986 A1    Dec. 26, 2019

(30) Foreign Application Priority Data
Jun. 20, 2018  (DE) .......................... 102018114820.8

(51) Int. Cl.
*B23F 23/12*  (2006.01)
*B23F 5/04*  (2006.01)

(52) U.S. Cl.
CPC ............ *B23F 23/1218* (2013.01); *B23F 5/04* (2013.01)

(58) Field of Classification Search
CPC .............................. B23F 23/1218; B23F 5/04
See application file for complete search history.

(56) References Cited

U.S. PATENT DOCUMENTS

2007/0275638 A1*  11/2007  Baldeck .................... B23F 9/02
                                                      451/11
2014/0141699 A1*   5/2014  Yanase .................... B23F 21/02
                                                      451/47

FOREIGN PATENT DOCUMENTS

DE     102008010301 A1     9/2009
DE     102010023728 A1    12/2011

* cited by examiner

*Primary Examiner* — Moshe Wilensky
*Assistant Examiner* — Kyle A Cook
(74) *Attorney, Agent, or Firm* — McCarter & English, LLP (57) ABSTRACT

A method for continuous generating grinding of at least two gear workpieces with a topologically modified grinding worm comprising a topologically modified worm region to grind tooth flanks which are topologically modified on the gear workpieces, wherein the method comprises at least the following steps:
  a) providing a first gear workpiece,
  b) performing a topological generating grinding operation by carrying out relative movements between the first gear workpiece and the grinding worm, which comprises a relative feed movement, a relative axial feed which occurs parallel or obliquely to the tool rotation axis, and a relative shift movement,
  c) providing the second gear workpiece,
  d) performing a relative jumping motion extending substantially parallel or obliquely to the tool rotation axis between the second gear workpiece and the grinding worm,
  e) repeating step b) for the second gear workpiece.

7 Claims, 5 Drawing Sheets

GRINDING MACHINE WITH CONTROL SYSTEM AND METHOD FOR TOPOLOGICAL GRINDING OF GEAR WORKPIECES

CROSS-REFERENCE TO RELATED APPLICATIONS

This application claims priority under 35 U.S.C. §§ 119 (a)-(d) to German patent application no. DE 10 2018 114 820.8 filed Jun. 20, 2018, which is hereby expressly incorporated by reference as part of the present disclosure.

FIELD OF THE INVENTION

The present disclosure generally relates to topological grinding, such as topological generating grinding, of several gear workpieces. For example, it relates to devices and methods for topological generating grinding of gear workpieces with a multi-dressable grinding worm. It also relates, for example, to a grinding machine with a control system for topological generating grinding of gear workpieces.

BACKGROUND

Figure 1:
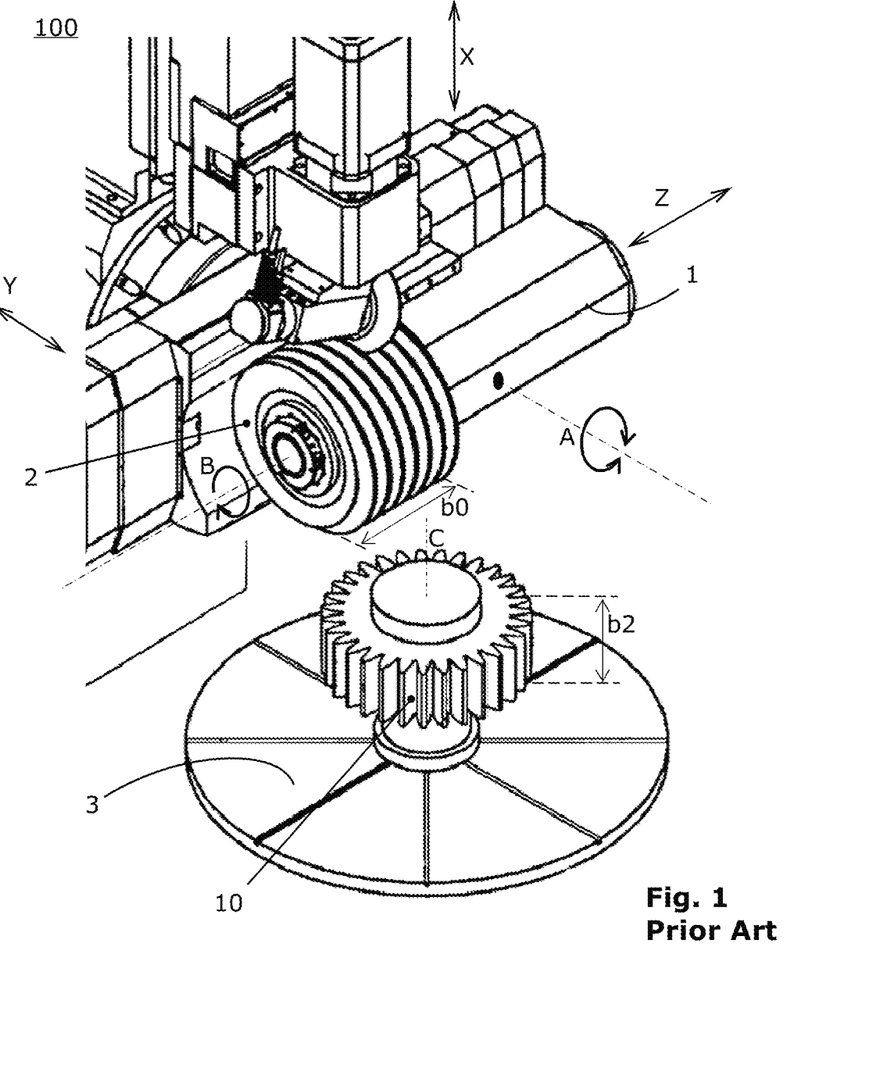
FIG. 1 schematically shows a perspective view of a prior art grinding machine.

FIG. 1 shows the elements of an exemplary grinding machine 100, wherein in this illustration only the essential elements are labeled, namely tool spindle 1 together with a grinding tool 2 and a workpiece spindle 3 with a workpiece 10. In addition, this illustration shows some of the axes that can be used for grinding, e.g., generating grinding, of workpiece 10. Three linear axes X, Y and Z are involved here. There is also a rotation axis B to be able to rotate the grinding tool 2. The tool spindle 1 together with the grinding tool 2 can be pivoted about a pivot axis A in order to get the pitch of the grinding worm 2 in line with the helix angle of the workpiece 10. Furthermore, there is a rotation axis C (also called workpiece axis) in order to be able to rotate the workpiece 10. FIG. 1 shows that a whole series of coordinated linear, rotary and pivoting movements are required in order to enable the grinding of a workpiece 10 with a grinding tool 2.

One of the factors that has an influence on the economic efficiency of such a grinding machine 100 is the service life of grinding tool 2, which is shown here in the form of a grinding worm. The faster tool 2 wears out, the fewer workpieces 10 can be machined with tool 2. There are therefore various strategies for using a grinding worm 2 as economically as possible.

Among other things, different shift strategies are used. Continuous shifting (sometimes also referred to as diagonal shifting) is a process in which the grinding machine 100 performs a continuous shift movement parallel to the Z axis in order to shift the grinding worm 2 relative to the workpiece 10. This form of shifting ensures that areas with new or adequately cutting abrasive grains of the grinding worm 2 are used. Shifting not only ensures the geometric accuracy of the gear workpieces but also largely prevents thermal damage to the tooth flanks.

There are also non-continuous shift strategies that are based, for example, on the fact that the grinding worm 2 is divided into different areas for roughing and for finishing a workpiece 10.

There are also shift strategies in which a shift is carried out after each machining of a workpiece 10, e.g., in order to be able to use a different area of the grinding worm 2 for machining the next workpiece.

Figure 5A:
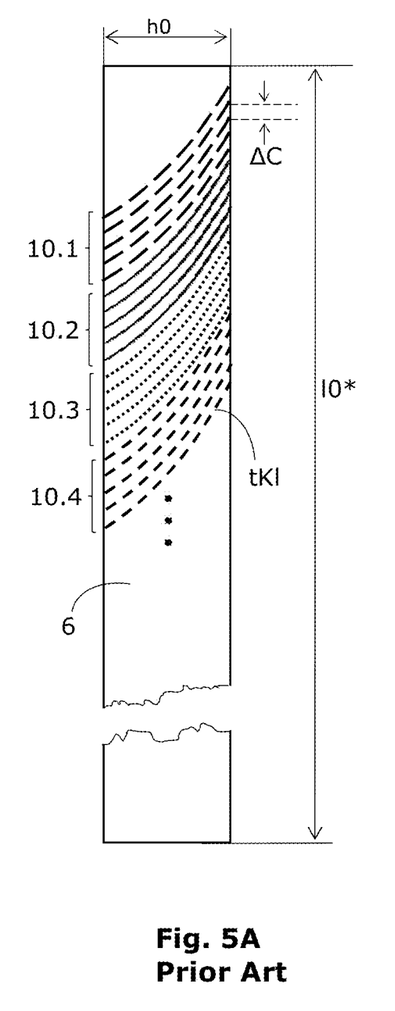
FIG. 5A schematically shows a development of a tooth flank of a grinding worm in enlarged representation, wherein the theoretical contact lines are indicated in schematic form, which result from conventional grinding of 4 workpieces.

In FIG. 5A, the development of a tooth flank (worm flank) 6 of a grinding worm 2 is shown in a strongly schematized form in an enlarged representation, wherein the theoretical contact lines tK1 are indicated in schematic form, which result from the conventional grinding of 4 workpieces 10.1-10.4. The contact lines tK1 of the 4 workpieces 10.1-10.4 are schematically represented by long-dashed, continuous, dotted and short-dashed sets of curves. Each of these sets of curves is assigned to a different workpiece 10.1-10.4. It can be seen that, due to the shifting for each of the 4 workpieces 10.1-10.4, an area with new or adequately cutting abrasive grains of the grinding worm 2 is used. The contact lines tK1 shown in FIG. 5A are rolling lines on a rectangle with side lengths h0 (tooth height) and 10* (reference helical length).

This relates to so-called topological generating grinding. Topological generating grinding of gear workpieces 10 uses a grinding worm 2 which comprises at least one worm region which is topologically modified. With the topologically modified worm region, the tooth flanks of the gear workpiece 10 can be given a modified tooth flank shape within certain limits. The desired geometry of the tooth flanks is predetermined in distorted form on the grinding worm flank surfaces and is mapped by precisely controlled, CNC-controlled relative movements between the grinding worm 2 and the gear workpiece 10 rectified on its tooth flanks.

During the topological generating grinding of a gear workpiece 10, the entire topologically modified worm region is used in order to be able to produce a modified tooth flank shape on the gear workpiece 10, e.g., tooth flanks with a modified pressure angle A grinding tool 2 can comprise a roughing and a finishing area. If the topologically modified worm region is in the finishing area, the finishing can be done with the topologically modified worm region, while previously the roughing was done conventionally.

In addition to the shifting, which is carried out to use the entire topologically modified worm region, a grinding stroke is also carried out during grinding, which is necessary to be able to grind workpieces 10 (see e.g., FIG. 1 or 2) over their entire tooth width b2. The grinding stroke of a straight-toothed spur gear 10, as shown in FIG. 1, comprises a linear movement of the grinding worm 2 parallel to the X-axis of the machine 100.

Furthermore, a feed movement is carried out to allow a tooth of the grinding worm 2 to penetrate to a final depth into a tooth gap of the gear workpiece 10. In the example of FIG. 1, the feed movement is parallel to the Y-axis of machine 100.

SUMMARY

There is a need to further optimize topological generating grinding with a grinding worm, for example, to improve service life of the grinding worms.

It is therefore an objective to provide a method for topological generating grinding that is more efficient than previous topological generating grinding processes.

It is also an objective to develop a control system and/or software for a grinding machine for machining by topological generating grinding of gearwheels, which allows reproducible high precision of the grinding machining and nevertheless high efficiency. In addition, an appropriate method will be provided to help improve efficiency.

At least some embodiments provide a grinding machine for topological generating grinding of spur gears that enables a consistently high precision of the grinding machining of a series of workpieces with an optimized service life of the grinding tool.

At least some embodiments utilize continuous grinding, e.g., continuous generating grinding, of at least two gear workpieces using a topologically modified grinding worm which comprises a topologically modified worm region to grind tooth flanks which are topologically modified on the gear workpieces. The method, according to at least some embodiments, comprises the following steps:

a) providing a first gear workpiece,
b) performing a topological generating grinding operation by carrying out relative movements between the first gear workpiece and the grinding worm, comprising
   a relative feed motion,
   a relative axial feed parallel or oblique to the tool rotation axis, and
   a relative shift movement,
c) providing a second gear workpiece,
d) performing a relative jumping motion extending substantially parallel or obliquely to the tool rotation axis between the second gear workpiece and the grinding worm,
e) repeating step b) to perform a topological generating grinding operation on the second gear workpiece.

The relative shift movement mentioned above can, for example, be defined in the known manner as the shift path per tool revolution.

In at least some of the embodiments, the relative jumping motion is carried out in such a way that the topological generating grinding operation of the first gear workpiece begins in a different contact area of the grinding worm than the topological generating grinding operation of the second gear workpiece.

For at least some of the embodiments, the relative jumping motion is carried out such that it is small relative to the extension (length) of the topologically modified worm region so as to avoid leaving or moving away from the topologically modified worm region by performing the relative jumping motion and the topological generating grinding operation. For example, relative jumping motions are can smaller than the shift path used per tool revolution, which is predetermined for machining by topological generating grinding.

In at least some of the embodiments, the relative jumping motion is only performed in the course of finish machining between topological generating grinding of a first gear workpiece and topological generating grinding of a second gear workpiece.

In at least some of the embodiments, the relative jumping motion is defined by a jumping distance, which in turn is determined from a contact density, wherein this contact density is a measure that characterizes the distribution of the load on the grinding worm when a certain number of workpieces are to be produced with one and the same grinding worm.

In at least some of the embodiments, the relative jumping motion is defined by a constant jumping width. This means that the jumping motion performed before the topological generating grinding of, e.g., a second gear workpiece has the same jumping width as the jumping motion performed before the topological generating grinding of, e.g., a tenth gear workpiece.

This summary is not exhaustive of the scope of the aspects and embodiments of the invention. Thus, while certain aspects and embodiments have been presented and/or outlined in this summary, it should be understood that the inventive aspects and embodiments are not limited to the aspects and embodiments in this summary. Indeed, other aspects and embodiments, which may be similar to and/or different from, the aspects and embodiments presented in this summary, will be apparent from the description, illustrations and/or claims, which follow, but in any case are not exhaustive or limiting.

It should also be understood that any aspects and embodiments that are described in this summary and elsewhere in this application and do not appear in the claims that follow are preserved for later presentation in this application or in one or more continuation patent applications.

BRIEF DESCRIPTION OF THE DRAWINGS

Exemplary embodiments, which are understood not to be limiting, are described in greater detail hereafter with reference to the drawings.

DETAILED DESCRIPTION

In connection with this description, terms are used which are also used in relevant publications and patents. It should be noted, however, that the use of these terms is for convenience only. The inventive idea and the scope of protection of the patent claims shall not be restricted in interpretation by the specific choice of terms. The invention can easily be transferred to other conceptual systems and/or fields. The terms are to be used analogously in other specialist areas.

It is known that topological generating grinding in a continuous grinding process can be used to produce gear workpieces 10 with tooth flanks that have been specifically modified. By using a grinding worm 2, which comprises a topologically modified worm region 5 (see, e.g., FIG. 3), it is possible, for example, to generate a crowning of the tooth flanks LF and RF of the gear workpieces 10 (see, e.g., FIG. 2). By providing a suitable crowning, the sensitivity to positional errors can be reduced when the gearwheel 10 is installed. In addition, noise emission can be influenced advantageously.

Topological generating grinding can be used in principle to reduce or completely prevent aberrations (also called interleaving) that occur during grinding with a grinding worm due to the continuously changing position of the contact lines. This is achieved by using the suitably modified worm region of a grinding worm in a precisely controlled manner. This requires a high-precision machine base of the grinding machine 200 (see, e.g., FIG. 6) and optimized drives which position and move the grinding worm 202 relative to the gear workpiece 210 with high repeat accuracy.

Figure 3:
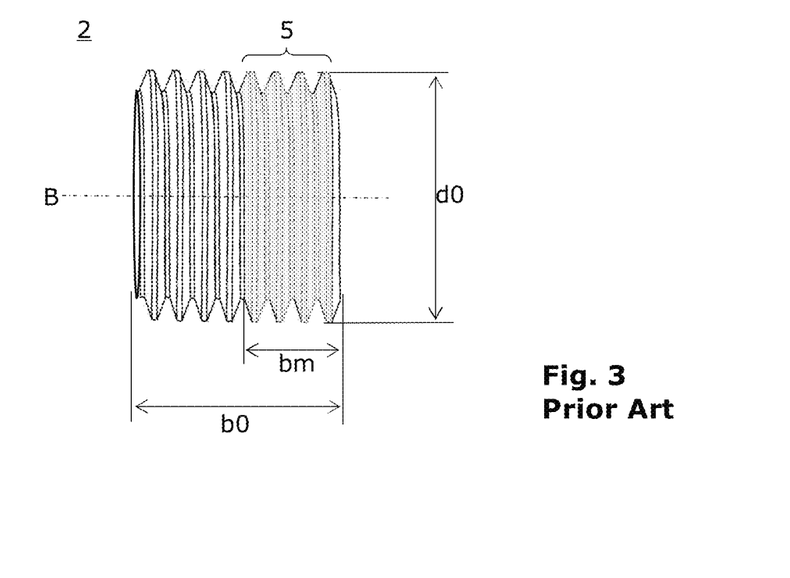
FIG. 3 schematically shows a side view of an exemplary prior art grinding worm.

A grinding worm 202, which can be used in connection with the method described here, may be similar to the grinding worm 2 shown in FIG. 3, has at least one topologically modified worm region 205. Using the grinding worm 2 as a reference, this topologically modified worm region may, for example, have a different profile angle over the width bm of the worm region 5. In the example shown in FIG. 3, the topologically modified worm region 5 extends over approximately half of the screw width b0. The diameter of the grinding worm 2 is indicated by d0. This diameter d0 reduces over time, as material is removed during dressing of the grinding worm 2.

Figure 2:
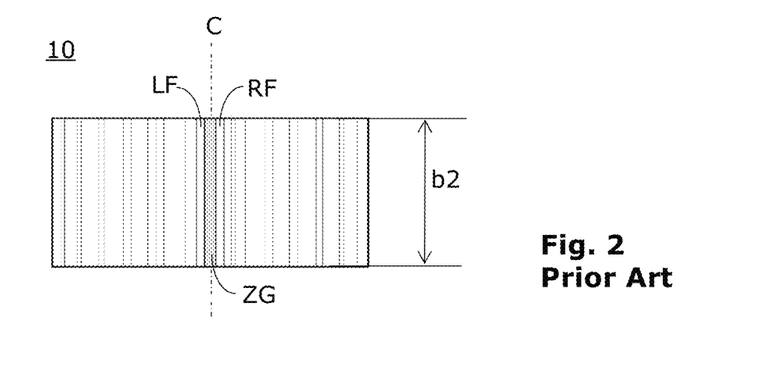
FIG. 2 schematically shows a side view of an exemplary spur gear with straight teeth of the prior art.

The topologically modified worm region 205 can, for example, be modified in a crowned manner by a change in the pitch height to give only one example of a possible modification of the topology of the grinding worm 202. However, the corresponding modifications of the grinding worm 202 are usually so small that they are hardly visible. In FIG. 3, the topologically modified worm region 5 is highlighted in grey in order to identify the region FIG. 2 shows a schematic side view of an exemplary straight-toothed spur gear 10 that is used here for reference. However, at least some embodiments can also be applied to helically toothed gear workpieces. On the reference gear workpiece 10 of FIG. 2, a tooth gap is particularly highlighted, which is bounded on the left by the tooth flank LF and on the right by the tooth flank RF. The tooth base ZG is shown in grey. The tooth width is indicated by the reference numeral b2.

Figure 4A:
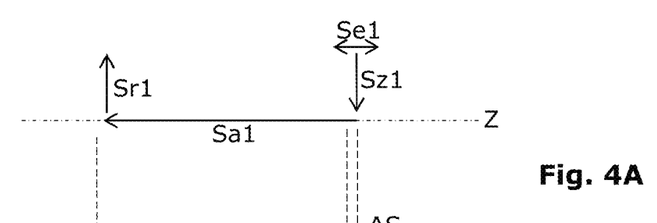
FIG. 4A shows a graphical representation of the steps of a method for topological generating grinding of a first gear workpiece.
Figure 4B:
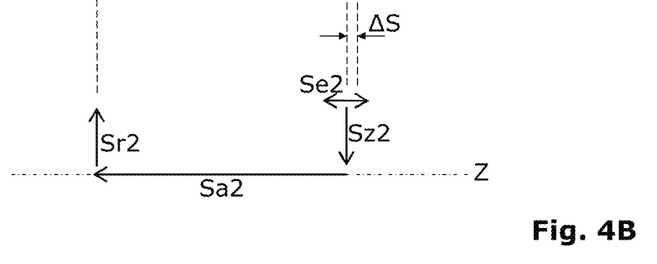
FIG. 4B shows a graphical representation of the steps of a method for topological generating grinding of a second gear workpiece.

At least some of the embodiments involve a method for continuous generating grinding of at least two gear workpieces 210.1, 210.2 of a series of gear workpieces. Details of the corresponding method steps are shown in FIGS. 4A and 4B in strongly schematized form, with the figures placed adjacent to each other for comparison. A topologically modified grinding worm 202 is used, which comprises at least one topologically modified worm region, which may be similar to the modified worm region 5 as shown as an example in FIG. 3. The continuous generating grinding process is carried out in such a way that tooth flanks LF, RF, which are topologically modified, are ground on the gear workpieces 210.1, 210.2. In the representation of FIGS. 4A and 4B, the tool (rotation) axis B coincides with the Z axis (shift axis).

The method according to at least some embodiments comprises at least the following steps, wherein the use of letters a), b), A., etc. shall not necessarily imply a corresponding chronological order of the steps:

a) Provision of a first gear workpiece 210.1, which can, for example, be removed from a parts store and clamped to the first workpiece spindle 203 of a grinding machine 200.

b) Performing a topological generating grinding operation by performing relative movements between the first gear workpiece 210.1 and the grinding worm 202 clamped to the tool spindle 201 of the grinding machine 200. This topological generating grinding operation comprises at least the following steps:

A. A relative feed movement Sz1 to bring the grinding worm 202 into engagement with the gear workpiece 210.1. In order to be able to insert the teeth of the grinding worm 202 cleanly into the tooth gaps of the first gear workpiece 210.1, a centering Se1 is carried out during feed or before feed. In FIG. 4A, the centering Se1 is symbolized schematically by a double arrow, which here runs transversely to the direction of the feed movement Sz1.

B. A relative axial feed Sa1 which is parallel or oblique to the tool rotation axis B. In the example in FIG. 4A, the axial feed Sa1 runs parallel to the tool rotation axis B, which in this example coincides with the Z axis.

C. A relative shift movement comprising shifting and twisting (the twisting is not visible in FIG. 4A).

At the end of the generating grinding operation on the first gear workpiece 210.1, a retraction movement Sr1 may be performed to cancel the engagement between the gear workpiece 210.1 and the grinding worm 202.

After the first gear workpiece 210.1 has been finished, another gear workpiece (e.g., the second gear workpiece 210.2) of the series of gear workpieces is provided. The machining of the second gear workpiece 210.2 is shown in FIG. 4B. This topological generating grinding operation comprises at least the following steps:

c) Provision of the second gear workpiece 210.2, which can, for example, be removed from the parts store and clamped to the first workpiece spindle 203 of a grinding machine 200.

d) Performing a relative jumping motion extending substantially parallel or obliquely to the tool rotation axis B, wherein said jumping motion is performed between the second gear workpiece 210.2 and the grinding worm 202 by moving at least one axis of the grinding machine 200. The purpose of carrying out a relative jumping motion is explained in detail below. In the area between FIGS. 4A and 4B, the relative jumping motion is represented by a jumping width ΔS. The jump distance ΔS is illustrated in an exaggerated large way in order to make it visible at all.

e) Repetition of step b) for the second gear workpiece 210.2 in order to subject the second gear workpiece 210.2 to a topological generating grinding operation. This topological generating grinding operation comprises at least the following steps:

A. A relative feed movement Sz2 to bring the grinding worm 202 into engagement with the gear workpiece 210.2. In order to be able to insert the teeth of the grinding worm 202 cleanly into the tooth gaps of the second gear workpiece 210.2, a centering Se2 is carried out within the scope of feeding or before feeding. In FIG. 4B, the centering Se2 is symbolized schematically by a double arrow, which here extends transversely to the direction of the feed movement Sz2.

B. A relative axial feed Sa2 which occurs parallel or obliquely to the tool rotation axis B. In the example in FIG. 4B, the axial feed Sa2 extends parallel to the tool rotation axis B.

C. A relative shifting movement which comprises shifting and twisting (the twisting is not visible in FIG. 4B).

At the end of the grinding operation on the second gear workpiece 210.2, a retraction movement Sr2 may be performed to cancel the engagement between the gear workpiece 210.2 and the grinding worm 2.

After grinding of the second gear workpiece 210.2 has been finished, another gear workpiece (e.g., a gear workpiece 210.3, 210.4) of the series of gear workpieces can be provided and machined. However, the machining process can also be terminated here.

Without performing a relative jumping motion, the topological generating grinding operation of the first gear workpiece 210.1 would start at the same point of the grinding worm 202 as the grinding operation of the second gear workpiece 210.2 and other gear workpieces. A brief reference is made here to FIG. 5B. Without carrying out a relative jumping motion, the topological generating grinding of all gear workpieces of a series of gear workpieces would be performed along the same theoretical contact line tK1 (e.g., along the contact line shown as a solid curve in FIG. 5B).

Figure 5B:
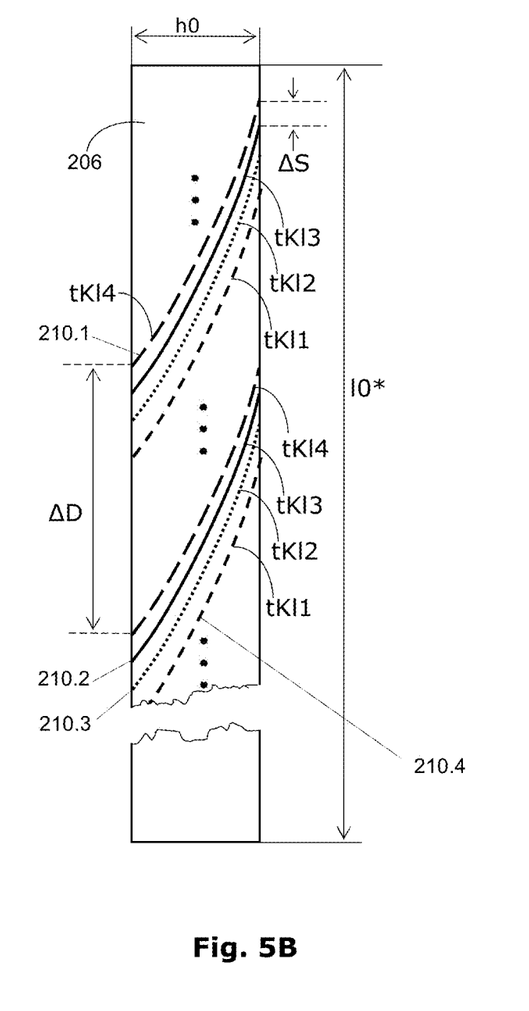
FIG. 5B schematically shows a development of a tooth flank of a topological generating grinding worm in enlarged representation, wherein the theoretical contact lines are indicated in schematic form, which arise during the topological generating grinding of 4 gear workpieces, if in each case a relative jumping motion is carried out before the grinding of each subsequent gear workpiece.

In at least some embodiments, a relative jumping motion is performed before topological generating grinding of a subsequent gear workpiece (e.g., before generating grinding of the second gear workpiece 210.2), which can be defined, e.g., by a jumping width ΔS (as schematically indicated in the area between FIGS. 4A and 4B or in FIG. 5B). This jumping motion occurs within the topologically modified worm region 205 of the grinding worm 202, e.g., if the topologically modified worm region 205 is to be used for grinding a subsequent gear workpiece, and the relative jumping motion is performed in such a way that the topological generating grinding does not lead outside of the modified worm region 205.

By specifying and carrying out a relative jumping motion, it is ensured that the grinding operation of the following gear workpiece begins at a different point in the topologically modified worm region 205 of the grinding worm 202 and follows a different theoretical contact line tK1, as indicated in FIG. 5B. Since it is a grinding worm 202 which comprises a topologically modified worm region 205, however, the relative jumping motion results in the first gear workpiece 210.1 being geometrically minimally different from the second gear workpiece 210.2. However, these differences are so minimal that they have no effect on the running behavior of the respectively ground gear workpieces 210.1, 210.2, 210.3, 210.4.

For at least some of the embodiments, the relative jumping motion is defined by a contact density EgD, wherein the contact density EgD can be a tool-specific parameter, i.e., for differently dimensioned and/or differently designed (e.g., differently coated grinding worms) grinding worms 202, the contact density EgD can also be different.

For at least some of the embodiments, a contact density EgD is assumed as a measure for an upper limit value, which has proven to be successful in the use of a grinding worm 202 with its minimum valid diameter (which for reference is shown as d0 in FIG. 3) for generating grinding of gear workpieces. See German patent application DE 102018109067.6 filed on behalf of Klingelnberg GmbH on Apr. 17, 2018. Due to the relative jumping motion, as described and claimed in this document, it can be ensured when using the topologically modified worm region 205 of the grinding worm 202 that the flanks of the grinding worm 202 are used in such a way that there is no accumulated contact density greater than this upper limit. However, such an upper limit value can also be determined in other ways (e.g. experimentally).

This contact density EgD, as described in the aforementioned German patent application DE 102018109067.6, can be considered along the helical lines or the tooth longitudinal direction and is defined as a reciprocal value to the screw path per tool revolution of the grinding worm 202 (in FIG. 5A this screw path per tool revolution of grinding worm 2 is designated as ΔC). This means that in this case the contact density EgD defines the number of interventions per screw travel.

As described in the German patent application DE 102018109067.6, the contact density EgD is significantly lower for the maximum grinding worm diameter than for the minimum grinding worm diameter achieved after multiple dressing of grinding worm 202.

For at least some of the embodiments, a jumping width ΔS of the relative jumping motion is calculated in a preparatory method step, e.g., using software or a software module SM. In at least some of these embodiments, the step width ΔS defines the relative position of the rolling lines (or the theoretical contact lines tK11-tK14 in FIG. 5B) in the topological generating grinding of several gear workpieces 210.1, 210.2, 210.3 and 210.4.

In at least some embodiments, the relative jumping motion is selected such that the jumping motion does not result in the subsequent topological generating grinding operation, including shifting, leading outside of the topologically modified worm region 205.

In at least some embodiments, the path length corresponds to a fraction of the shift path per tool revolution for at least part of the embodiments. The path length for at least some embodiments is less than 1% of the width of the modified worm region.

Instead of defining the jumping motion by a path length parallel to the tool rotation axis B, it can also be defined by another variable (e.g., by a path parallel to the winding flank line of the grinding worm 202).

In at least some of the embodiments, the relative jumping motion parallel to the tool rotation axis B is defined and/or carried out in such a way that the subsequent topological generating grinding operation can only be performed within a topologically modified worm region 205. For this purpose, for example, the limits of the topologically modified worm region 205 can be defined by relative or absolute values in a controller 209 and/or in a software or software module SM of the grinding machine 200 or other component.

Figure 6:
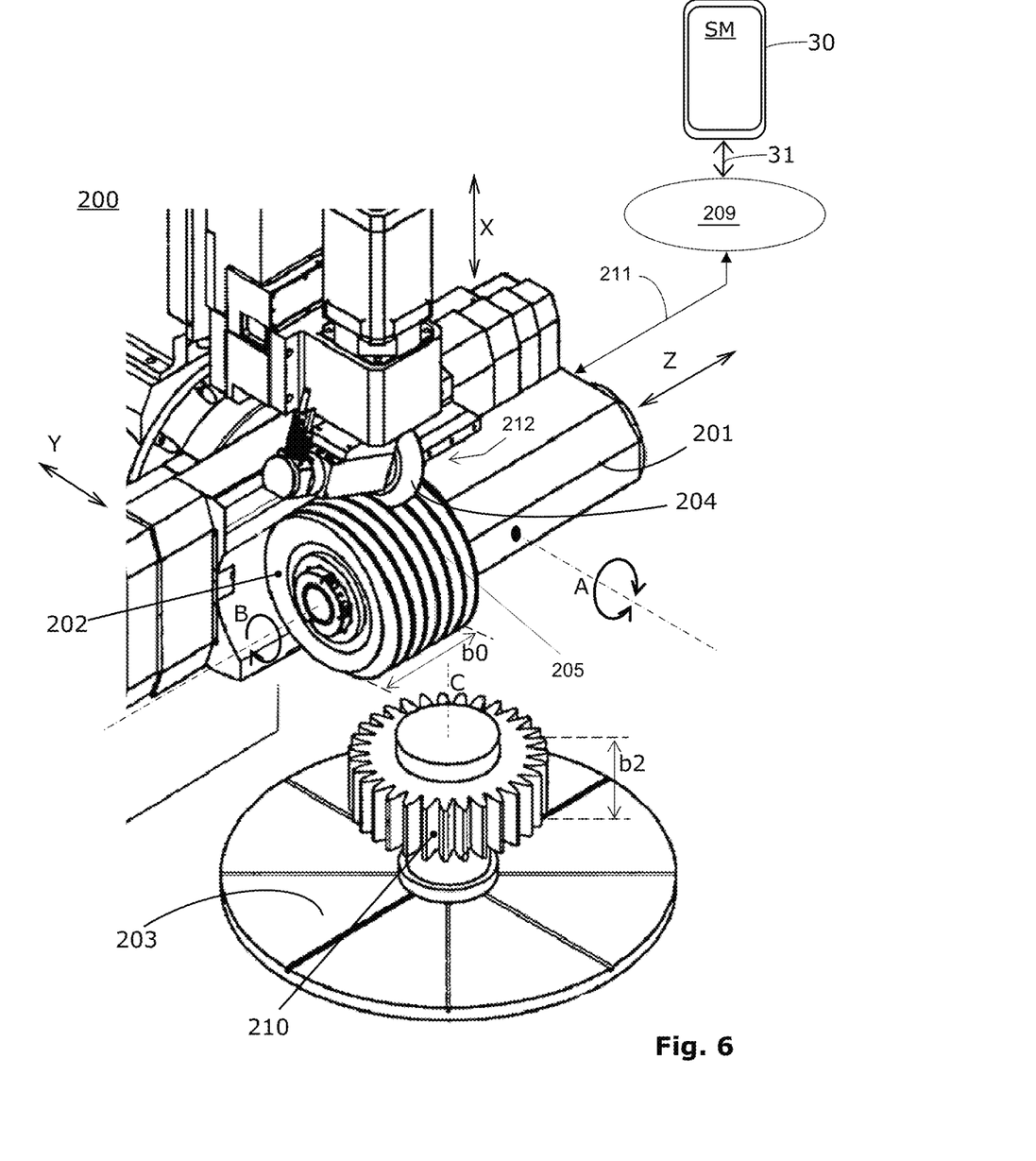
FIG. 6 schematically shows a perspective view of a grinding machine.

A grinding machine 200 is used for at least some of the embodiments, as shown as an example in FIG. 6. The grinding machine 200 comprises a tool spindle 201, which is designed to pick up and rotationally drive a grinding worm 202 around a tool rotation axis B. It also includes a workpiece spindle 203 designed to pick up and rotationally drive a gear workpiece 210 from a series of gear workpieces 210.1, 210.2.

The grinding machine 200 can also include a dressing device 212, which is designed to pick up and rotationally drive a dresser 204. Furthermore, the grinding machine 200 has several NC-controlled axes for carrying out the relative movements between the grinding worm 202 and a gear workpiece 210, which are required for topological generating grinding of the gear workpiece 210 and for dressing. In addition, the grinding machine 200 comprises a controller 209 or, alternatively, is connectable to the grinding machine 200 (e.g., via an internal or external communication link 211) such that after topological generating grinding of a first gear workpiece 210.1 of the series of gear workpieces, and before topological generating grinding of a second gear workpiece 210.2 of the series of gear workpieces, a relative jumping motion can be carried out. As already explained, this jumping motion is a small relative movement between the workpiece spindle 203 and the tool spindle 201, or between the workpiece 210.2 and the grinding worm 202. The jumping motion extends essentially parallel or obliquely to the tool rotation axis B.

The grinding machine 200 may include means 30 (e.g., a portable device) and/or a software module SM for user input for at least some of the embodiments, which enable a user to select or input a parameter, for example a contact density EgD, wherein the relative jumping motion is carried out on the basis of the parameter, respectively on the basis of the contact density EgD.

The grinding machine 200 may include means 30 (e.g., a portable device) and/or a software module SM for user input in at least some of the embodiments, which enable a user to select or enter a jumping width ΔS of the relative jumping motion.

FIGS. 4A and 4B show that the relative jumping motion changes the position of the grinding worm 202 relative to the position of the gear workpiece. In addition, the relative position may have changed due to the clamping of the first gear workpiece 210.1 and the clamping of the second gear workpiece 210.2. For this reason, in at least some embodiments, a centering Se1 or Se2 is carried out before grinding a gear workpiece 210.1 and 210.2.

FIG. 5A shows, as already described at the beginning, a strongly schematized development of a tooth flank 6 of a grinding worm 2 in enlarged form. Here, the theoretical contact lines tK1 are indicated in schematic form, which result from the conventional generating grinding of 4 workpieces 10.1, 10.2, 10.3 and 10.4.

FIG. 5B on, the other hand, shows details of new embodiments. FIG. 5B shows a strongly schematized development of a tooth flank 206 of a topological generating grinding worm 202 in enlarged form. Here, the theoretical contact lines tK11, tK12, tK13, tK14 are indicated in schematic form, which arise during the topological generating grinding of 4 gear workpieces 210.1, 210.2, 210.3 and 210.4, if a relative jumping motion, according to at least some embodiments, is carried out in each case before the grinding of each subsequent gear workpiece. The screw travel per tool revolution is indicated in FIG. 5B with ΔD. The screw travel per tool revolution ΔD is significantly greater than the screw travel per tool revolution ΔC shown in FIG. 5A for conventional generating grinding.

In connection with FIGS. 5A and 5B, it should be finally mentioned that the contact lines shown discreetly are theoretical lines. In practice, due to the mutual effects of forces, contact zones actually overlap.

While the above describes certain embodiments, those skilled in the art should understand that the foregoing description is not intended to limit the spirit or scope of the present disclosure. It should also be understood that the embodiments of the present disclosure described herein are merely exemplary and that a person skilled in the art may make any variations and modification without departing from the spirit and scope of the disclosure. For example, though embodiments herein are described in the context of topological generating grinding, it should be understood that the invention may be applied to other types of grinding, including but not limited to other types of topological grinding. All such variations and modifications, including those discussed above, are intended to be included within the scope of the disclosure.

What is claimed is:

1. A method comprising:
    continuous generating grinding of at least a first gear workpiece and a second gear workpiece using a topologically modified grinding worm defining a topologically modified worm region, rotatable about a tool rotation axis, and configured to grind gear workpiece tooth flanks, thereby topologically modifying tooth flanks on the at least first and second gear workpieces;
    wherein the method further includes:
    a relative shift movement, wherein a shift path per revolution of the grinding worm defines a width;
    b) performing a relative jumping motion between the second gear workpiece and the grinding worm extending substantially parallel or obliquely to the tool rotation axis, wherein the relative jumping motion comprises relative shifting and relative twisting between the second gear workpiece and the grinding worm and wherein the relative jumping motion extends substantially parallel to the tool rotation axis, and defines a path length or jumping width shorter than the width of the shift path per revolution of the grinding worm; and
    c) repeating step a) for topological generating grinding the second gear workpiece.

2. The method according to claim 1, wherein said path length or jumping width is less than 1% of a width of the topologically modified worm region.

3. The method according to claim 1, wherein the topologically ground first gear workpiece is geometrically different from the topologically ground second gear workpiece due to the relative jumping motion performed prior to repeating step a).

4. The method according to claim 1, wherein the relative jumping motion defines the path length or jumping width corresponding to a fraction of the width of the shift path per revolution of the grinding worm.

5. The method according to claim 1, further comprising:
    selecting or predetermining a parameter of the grinding worm, and
    determining said path length or jumping width using the parameter.

6. The method according to claim 5, wherein the parameter defines a contact density of the grinding worm.

7. The method according to claim 6, wherein
    the contact density defines a quantity for said generating grinding of the at least first and second gear workpieces, or
    the contact density defines an accumulated maximum quantity not exceeded during said topological generating grinding of the at least first and second gear workpieces.

* * * * *